June 24, 1930. J. T. PEARSON 1,767,226
COVER FOR CONDUIT OUTLET BOXES
Filed Sept. 7, 1928
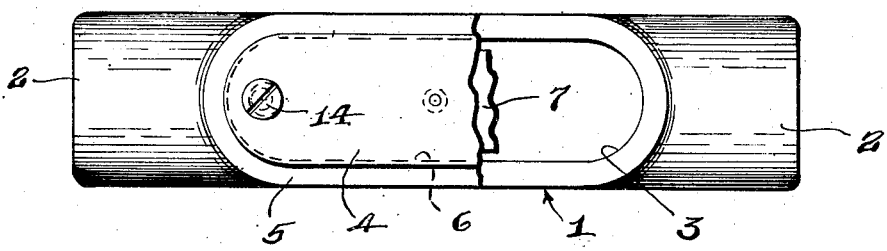
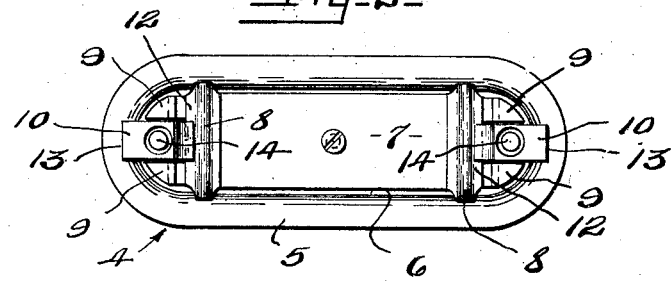
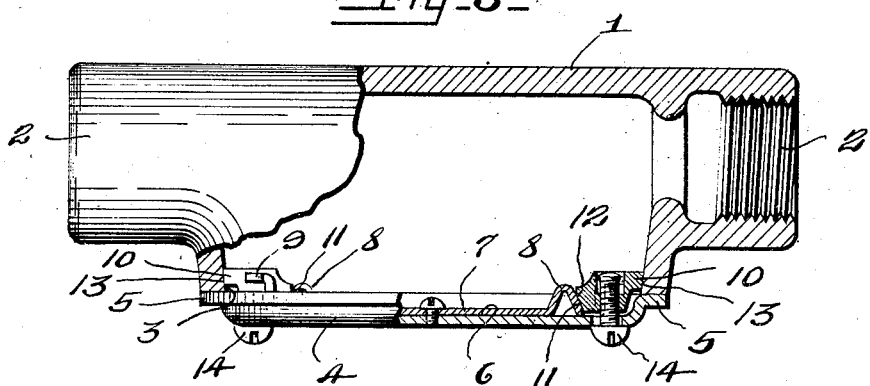
INVENTOR.
John T. Pearson
BY Parsons & Rodell
ATTORNEYS.

Patented June 24, 1930

1,767,226

UNITED STATES PATENT OFFICE

JOHN T. PEARSON, OF SYRACUSE, NEW YORK, ASSIGNOR TO CROUSE-HINDS COMPANY, OF SYRACUSE, NEW YORK, A CORPORATION OF NEW YORK

COVER FOR CONDUIT OUTLET BOXES

Application filed September 7, 1928. Serial No. 304,504.

This invention relates to electrical conduit outlet boxes of the type having elongated unobstructed openings, and has for its object a particularly simple, compact and efficient arrangement of fastening means self-contained with the cover and located at the ends of the cover in position to coact with the end walls of the opening of the box to secure the cover to the box.

The invention consists in the novel features and in the combinations and constructions hereinafter set forth and claimed.

In describing this invention, reference is had to the accompanying drawings in which like characters designate corresponding parts in all the views.

Figure 1 is a plan view of an outlet box embodying my invention, the cover being partly broken away.

Figure 2 is an inner face view of the cover.

Figure 3 is a side elevation, partly broken away and partly in section, of parts seen in Figure 1.

1 designates a conduit outlet box, here shown as elongated in form and having one or more nipples 2 for connection to electric conduits.

3 is the elongated opening in one side of the box, the inner walls of the opening being unobstructed as by lugs in order to permit handling of the wires without danger of abrading them on obstructions and also to avoid skinning of the fingers of the wireman coming in contact with the obstructions or lugs. The end walls of the opening are usually rounding or the opening is in the general form of an oblong with rounded ends.

4 designates the cover, this cover having transverse ribs on its inner side and near its ends and also guides. The means for fastening the cover to the box comprises wedge blocks movable in the guides lengthwise of the cover and having means for coacting inclined plane fashion with the ribs when the wedge blocks are tightened and means operable from the outside of the cover for tightening the blocks and hence move them into engagement with the inner faces of the end walls of the opening 3.

As here illustrated, the cover includes a body having a marginal flange 5 for resting on the edge of the wall of the box around the opening 3 and a central depression or recess 6 on its inner side within the marginal flange and conforming to the same. A plate 7 is mounted in the recess 6 and transverse ribs 8 are provided in the plate near the ends thereof. The plate is also formed at its ends with angular lugs 9, the lugs at each end being spaced apart and forming guides for the wedge blocks 10. These wedge blocks are provided with inclined faces 11 at one end which coact with inclined faces 12 on the ribs and the blocks also have engaging ends 13 for thrusting against the inner faces of the end walls of the box around the opening 3. The wedge blocks are tightened by screws 14 extending through the cover and threading into the wedge blocks. The wedge blocks and screws, per se, form no part of this invention.

In operation, the cover is placed in position and the wedge blocks tightened into engagement with the walls of the opening thus firmly securing the cover into position. Owing to this arrangement of the fastening means at the ends of the cover, the fastening means is wholly out of the paths of the wires in the box and leaves a maximum space in the central part of the cover for openings for the outlet of wires. Furthermore, owing to the location of the fastening means at the ends of the box, all liability of the fastening means fouling on the wires is eliminated.

What I claim is:

1. The combination of a conduit outlet box, having an elongated unobstructed opening in one side thereof, a cover for the open side of the box, said cover having a marginal flange for coacting with the edge wall of the box around the opening, means secured to the under side of the cover for alining the same on the opening of the box, comprising a plate with cross ribs formed near each end thereof, said ribs having inclined sides and being substantially the same length as the width of the opening in the box, wedge means located at the end of the cover and securing the cover to the box, said wedge means being movable lengthwise of the cover and operable from the outer side of the cover and when operated, engaging an inclined side of the adjacent rib and the end of the opening in the box.

2. The combination of a conduit outlet box having an elongated unobstructed opening in one side thereof, a cover for the box provided with transverse ribs on its inner side near and spaced apart from the ends of the cover and with guides between the ribs and the ends of the cover, wedges movable along the guides, the wedges and the ribs having means coacting inclined plane fashion for forcing the wedges outwardly and operating means for the wedges extending through the end portions of the cover to the outer side thereof.

3. The combination of a conduit outlet box having an elongated unobstructed opening in one side thereof, and a cover for the opening comprising a body formed with a marginal flange portion for coacting with the edge of the wall of the box around the opening and an elongated recess within the marginal flange on the inner side of the cover, a plate mounted in the recess conforming to the outline of the same, the plate being formed with transverse ribs near its ends and with upturned lugs at its ends, the lugs at each end being spaced apart forming guides, wedge blocks located in the guides, the wedge blocks and the ribs having means coacting inclined plane fashion to move the wedges outwardly during the tightening thereof and means extending through the cover to the outer side thereof for tightening the wedges.

In testimony whereof, I have hereunto signed my name, at Syracuse, in the county of Onondaga, and State of New York, this 4th day of Sept., 1928.

JOHN T. PEARSON.